(12) United States Patent
Rehmat et al.

(10) Patent No.: US 10,880,341 B1
(45) Date of Patent: Dec. 29, 2020

(54) MODIFYING A CHALLENGE REQUIREMENT FOR USER REGISTRATIONS

(71) Applicant: T-Mobile USA, Inc., Bellevue, WA (US)

(72) Inventors: Umair Rehmat, Redmond, WA (US); Shujaur Rehman Mufti, Snoqualmie, WA (US); Khurram Ahmad Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/783,911

(22) Filed: Feb. 6, 2020

(51) Int. Cl.
*H04L 29/06* (2006.01)
*H04W 68/12* (2009.01)
*H04W 88/06* (2009.01)
*H04W 60/00* (2009.01)

(52) U.S. Cl.
CPC ...... *H04L 65/1073* (2013.01); *H04L 65/1016* (2013.01); *H04W 60/005* (2013.01); *H04W 68/12* (2013.01); *H04W 88/06* (2013.01)

(58) Field of Classification Search
CPC . H04L 29/06; H04L 65/1073; H04L 65/1016; H04L 65/1013; H04L 65/1046; H04L 29/06346; H04L 29/0634; H04L 29/06353; H04L 65/1066; H04L 65/1076; H04L 65/1083; H04L 9/3271; H04W 68/12; H04W 60/00; H04W 60/005; H04W 88/06; H04W 92/00; H04W 92/08; H04W 88/00; H04W 8/082; H04W 88/08; H04W 88/02; H04W 12/0602; H04W 12/005; H04W 12/00; H04W 12/08; H04W 4/16; H04W 4/18; H04W 12/12; H04W 12/0608; H04M 3/42272; H04M 3/4288; H04M 3/436; H04M 2250/60
See application file for complete search history.

(56) References Cited

U.S. PATENT DOCUMENTS

| | | | |
|---|---|---|---|
| 2009/0098851 A1* | 4/2009 | Liebhart | 455/404.1 |
| 2010/0136970 A1* | 6/2010 | Mui et al. | 455/435.1 |
| 2012/0127851 A1* | 5/2012 | Le Rouzic et al. | 370/216 |
| 2016/0100375 A1* | 4/2016 | Chiduruppa et al. | H04W 60/00 |
| 2019/0098103 A1* | 3/2019 | El-Gawady et al. | H04L 67/26 |
| 2019/3122916 * | 10/2019 | Siddappa et al. | H04L 65/1073 |
| 2019/0342413 A1* | 11/2019 | Klein et al. | H04L 67/26 |
| 2020/0068382 A1* | 2/2020 | Kumar et al. | H04W 8/183 |

* cited by examiner

*Primary Examiner* — Meless N Zewdu
(74) *Attorney, Agent, or Firm* — Lee & Hayes, P.C.

(57) ABSTRACT

Systems and methods for modifying a challenge requirement for user equipment registrations are described herein. The systems and methods enable a registrar of a network to modify a user equipment to reconfigure the user equipment to perform an initial registration, whereby the user equipment waits for a challenge from the network, rather than a refresh registration.

20 Claims, 5 Drawing Sheets

MODIFYING A CHALLENGE REQUIREMENT FOR USER REGISTRATIONS

BACKGROUND

In current Voice over Long-Term Evolution (VoLTE) systems, during an initial registration of a user equipment (UE), a UE will hold off on sending an INVITE message for a call origination until a message is received from the registering entity indicating the initial registration is successful. The received message in some examples is a 200 OK message. However, for refresh registrations, in which the registration is refreshed after the initial registration, the UE typically doesn't wait until the 200 OK message is received and will go ahead and will send an INVITE even before the 200 OK is received. In some circumstances, because the UE may proceed with an INVITE without waiting for the 200 OK message, there is the possibility that the network will utilize a UE's international mobile subscriber identity (IMSI) instead of the mobile station international subscriber directory number (MSISDN). This means that the caller ID the recipient sees may be the originating UE's IMSI instead of the cell phone number.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
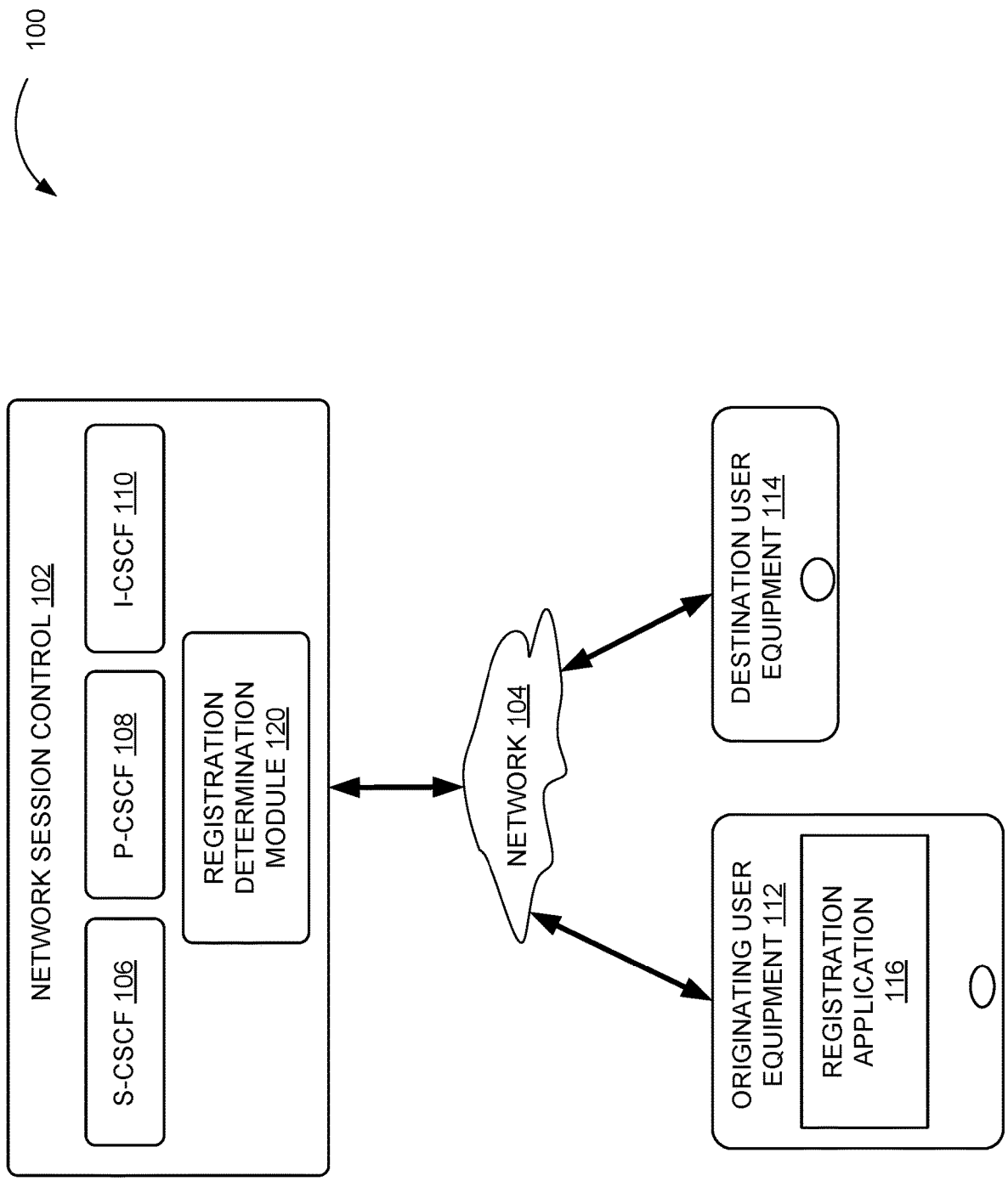
FIG. 1 depicts a system for modifying a challenge requirement for user registrations, in accordance with some examples of the present disclosure.

Examples of the present disclosure can comprise systems and methods for modifying a challenge requirement for user equipment registrations. Networks, such as IP Multimedia Subsystem (IMS) networks, routinely challenge UEs following a successful initial registration. The process typically involves the transmission of a registration request, a 401 Unauthorized message indicating that the UE is not registered, a sending of a second registration message, and then once registered, an acknowledgment message such as a 200 OK message.

When a UE is instructed to commence the connection of a call, the UE transmits an INVITE message to the network to instruct the network to connect the UE with the destination UE. In typical VoLTE UEs, the UEs are usually configured to wait for a 200 OK message (indicating that the device is registered) for initial registrations. For refresh registrations, the VoLTE UE can proceed with the transmission of the INVITE message regardless of the 200 OK message for registration being received or not.

In these instances, sometimes referred to a "race" condition, whereby the network races to refresh the registration and the device races to send the INVITE message, because there may be issues created when the two processes are pitted against each other, the result may be poor user experiences, such as the aforementioned instance in which the destination UE receives and displays the originating UE's IMSI rather than the originating UE's cell phone number.

For example, a Proxy-Call Session Control Function (P-CSCF) may be handling an INVITE for a UE which has not completed a challenged registration but for which a 401 Unauthorized message was received. The P-CSCF, upon receiving 200 OK for successful registration, constructs the P-Asserted Identity (PAI) based on the P-Asserted URI (SIP URI) received from the Session Initiation Protocol (SIP) Registrar (which contains the MSISDN). In the case of an out-of-sequence INVITE received before the challenged refresh registration completes, the P-CSCF utilizes user data based on a previous registration. If the VoLTE device had initially registered via IMSI for instance, the P-CSCF constructs the PAI using the IMSI and the terminating user sees IMSI instead of MSISDN. The display of the IMSI rather than the MSISDN can have security as well as user experience implications.

Further, there may be other reasons to require that a refresh registration be conducted in the same manner as an initial registration. For example, the use of an initial registration rather than a refresh registration may be used to help balance a load on a network. Because of the additional time required to perform an initial registration due to the challenge requirement, the process can be used to delay connecting a UE. This may be helpful when a bandwidth usage of a network meets or exceeds a threshold value. Further, the delay may be used after an emergency to prevent all UEs from attempting to connect at the same time, potentially causing issues with the network.

The systems and methods discussed herein are discussed generally with respect to cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

As shown in FIG. 1, examples of the present disclosure can comprise a system 100 for modifying a challenge requirement for user equipment registrations. In some examples, the system 100 includes a network session control 102 used to implement a network 104. In some examples, the network session control 102 includes a Serving-Call Session Control Function (S-CSCF) 106, a Proxy-CSCF (P-CSCF) 108, and an Interrogating-CSCF (I-CSCF) 110.

The P-CSCF 108 is the entry point for a user equipment to request services from the network 104. The incoming requests are either the initial registration or an invitation for a multimedia session. Requests that are a session invitation are directed by the P-CSCF 108 to the S-CSCF 106. The P-CSCF 108 is also capable of handling emergency call sessions.

The I-CSCF 110 determines which S-CSCF, such as the S-CSCF 106, should be assigned for controlling the session requested by a user equipment. The S-CSCF 106 is responsible for conducting both registration and session control for a registered user equipment session. The S-CSCF 106 acts as the registrar and allows or denies service to the user equipment.

During use of the network, subscribers to the network may be allocated a particular S-CSCF, such as the S-CSCF 106, for the duration of their IMS registration. This helps the system 100 route SIP messages when establishing services. The network session control 102 handles the registration and session control for registered user devices. Other types of network session control 102 may be used and are considered to be within the scope of the presently disclosed subject matter.

The system 100 further includes an originating user equipment (UE) 112 and a destination UE 114. To place a call, if the UE has not previously registered with the S-CSCF 106, a registration application 116 of the originating UE 112 instructs the originating UE 112 to perform an initial registration. In some examples, the registration application 116 is stored on a persistent memory of the originating UE 112 and executed as software, or may be implemented via hardware, or may be a combination of hardware and software.

During an example initial registration, the originating UE 112 transmits a REGISTER message to the network session control 102 S-CSCF 106 (acting as the registrar for the network 104). The S-CSCF 106 transmits a 401 UNAUTHORIZED message to the originating UE 112 to challenge the UE. The originating UE 112 transmits a REGISTER message in response to the challenge of the 401 UNAUTHORIZED message. During the refresh registration mode, the originating UE 112 does not wait to receive the challenge message (for example, the 401 UNAUTHORIZED message) prior to transmitting a request to place a call, such as an INVITE message used to cause the connection of the originating UE 112 to the destination UE 114.

However, because of various reasons, it may be worthwhile to modify the challenge requirement. For example, as noted above, since VoLTE devices, such as the originating UE 112, only honor holding an INVITE message for the initial registration, there is a possibility that the originating UE 112 may send an INVITE for IMS multimedia telephony (MMTel) services before the challenged registration is completed (i.e. the 200 OK is received). This can lead to race conditions within the network and ultimately poor user experience.

In another example, the number of times the originating UE 112 performed a refresh registration rather than an initial registration may be at or above a predetermined number of refresh registrations. The predetermined number may vary from system to system or may be based on a standard set within an industry. Enforcing or implementing challenged registrations may be performed at predetermined intervals due to security considerations, such as security bindings updates, security keys updates, and the like. Another reason may be that the originating UE 112 may be a lower priority UE than a second UE (not shown) attempting to register for to connect to a destination UE. In these situations, the higher priority UE may be a device used by an emergency service personnel or may be a device with a particular subscription that allows for priority on the network 104. In this example, a network may receive a notification that an emergency condition, such as a fire in which the use of the network for emergency service personnel is preferred, has occurred that effects the network. In another example, the network may receive an indication that a network resource is disabled, and that the initial registration may be used to balance a load on the network. For example, the network resource may be one or more base stations that, when disabled, place an additional load on operating base stations. Using an initial registration may provide a delay in connecting UEs that can be used to balance loads on the network.

A still further reason may be that the network 104 has a data transfer amount (bandwidth) above which the network 104 will start requiring initial registrations rather than refresh registrations. For example, requiring the performance of an initial registration may input a delay for the network 104 to handle other INVITEs, thus reducing the load on the system. Another reason for requiring an initial registration rather than a refresh registration may be that the that a request to place a call is not received within a period of time associated with another call request associated with a particular destination telephone number. A user may have one or more particular destination telephone numbers stored in an account that, if called within a period of time, overrides or obviates the need for an initial registration. For example, a home phone number that is contacted often. However, if the user does not call the particular destination number within a predetermined period of time, an initial registration may be required rather than a refresh registration.

For these and other examples, the network session control 102 may determine that the originating UE 112 should go through an initial registration operation rather than a refresh registration operation. Thus, a registration determination module 120 of the network session control 102 may determine that the next registration operation of the originating UE 112 is to be an initial registration operation, where the originating UE 112 is to wait for an indication that the challenge is completed successful, rather than a refresh registration.

When a refresh registration is required by the refresh determination module 120, the network session control 102, or another component of the network 104, may transmit an instruction to the registration application 116 of the originating UE 112 that the next registration is to be an initial registration rather than a refresh registration. In this example, in the next registration, the originating UE 112 will wait for an acknowledgement from the network 104 (e.g. a 200 OK message) prior to the originating UE 112 transmitting the request to place the call.

Figure 2:
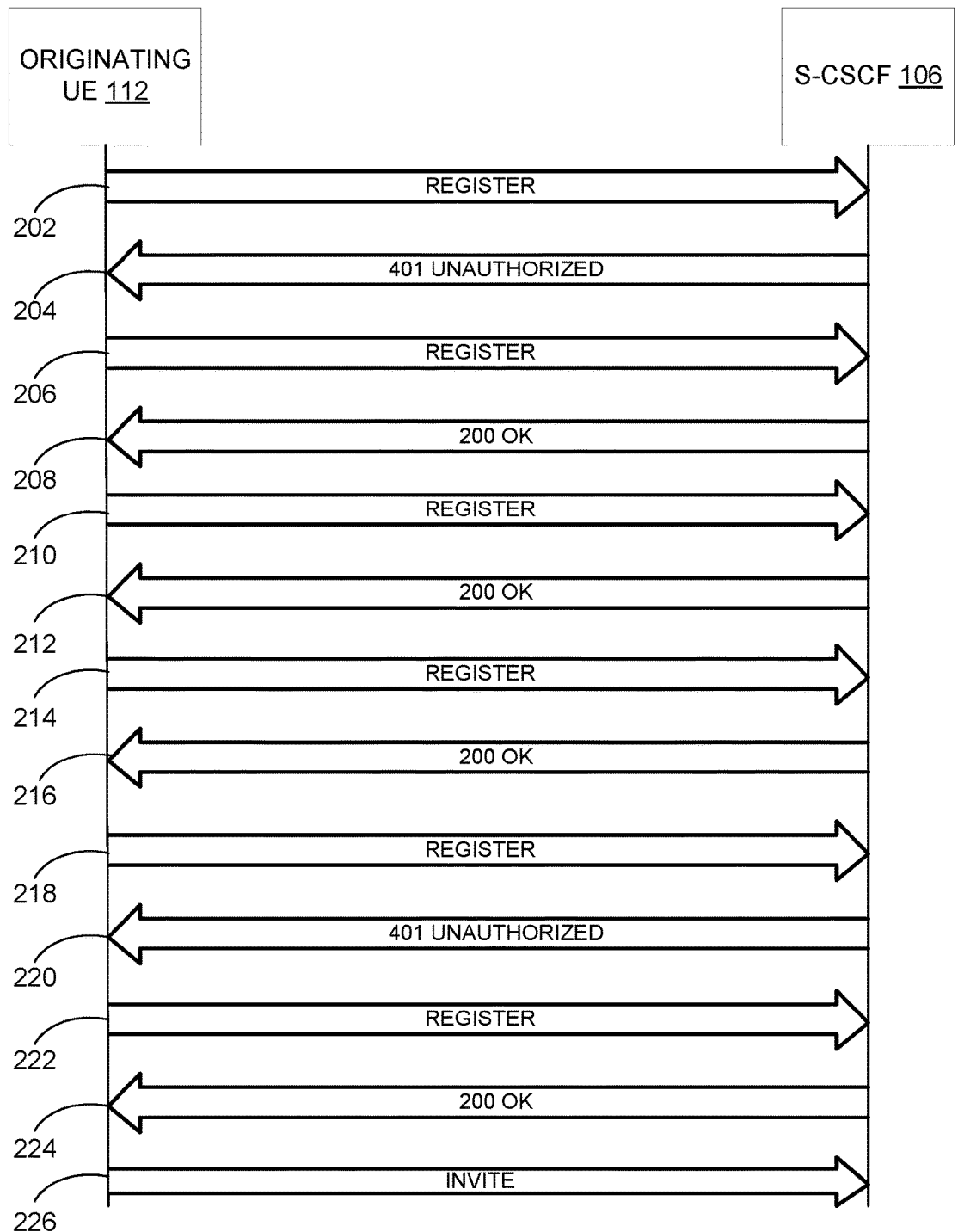
FIG. 2 is a call signal flow diagram illustrating modifying a challenge requirement for user registrations, in accordance with some examples of the present disclosure.

FIG. 2 is a call signal flow diagram illustrating modifying a challenge requirement for user registrations. In FIG. 2, the S-CSCF 106 is the registrar for the originating UE 112. As illustrated, operation 202 is an initial registration. The originating UE 112 will issue a REGISTER message requesting registration. The S-CSCF 106, at operation 204, issues a 401 UNAUTHORIZED message, indicating to the originating UE 112 that the originating UE 112 is not registered. The UNAUTHORIZED message is often termed a challenge, in which the originating UE 112 will issue a challenge response at operation 206. Following a successful challenge response at 206, the S-CSCF 106 shall issue a 200 OK message at operation 208 with a header indicating to the device that a subsequent registration will not be challenged. Operations 210-216 are refresh registrations. As noted above, a refresh registration is a registration in which the originating UE 112 is not challenged and does not wait for an acknowledgment that the originating UE 112 is registered before sending an INVITE to request a call connection.

As noted above, it may be determined that the originating UE 112 needs to perform an initial registration rather than a refresh registration. In that manner, in the 200 OK message at operation 216, the 200 OK message will include a heading indicating that a subsequent registration is to be challenged and that the originating UE 112 is to wait for a challenge before transmitting an INVITE message, such as the registration operations 218-224. In one example of the presently disclosed subject matter, the S-CSCF 106 may specify in a header of the 200 OK message indicating a challenge condition of the UE 112. For example, the header may be, for example and not by way of limitation, a "NO" or "auth-required:no," or similar variations indicating the next registration is a refresh registration, or a "YES," or "auth-required:yes" or similar variations indicating the next registration is an initial or challenged registration. The indicating header may be of any similar type with yes/no/1/0 or similar combinations. This provides for the ability of the UE 112 to be reconfigured to prepare and hold (or not if a refresh registration) the INVITE until the 200 OK is received indicating a successful initial registration operation. As an example of waiting for the challenge operation to be completed, at operation 226, the originating UE 112 transmits the INVITE message upon receipt of the 200 OK message at operation 224.

Figure 3:
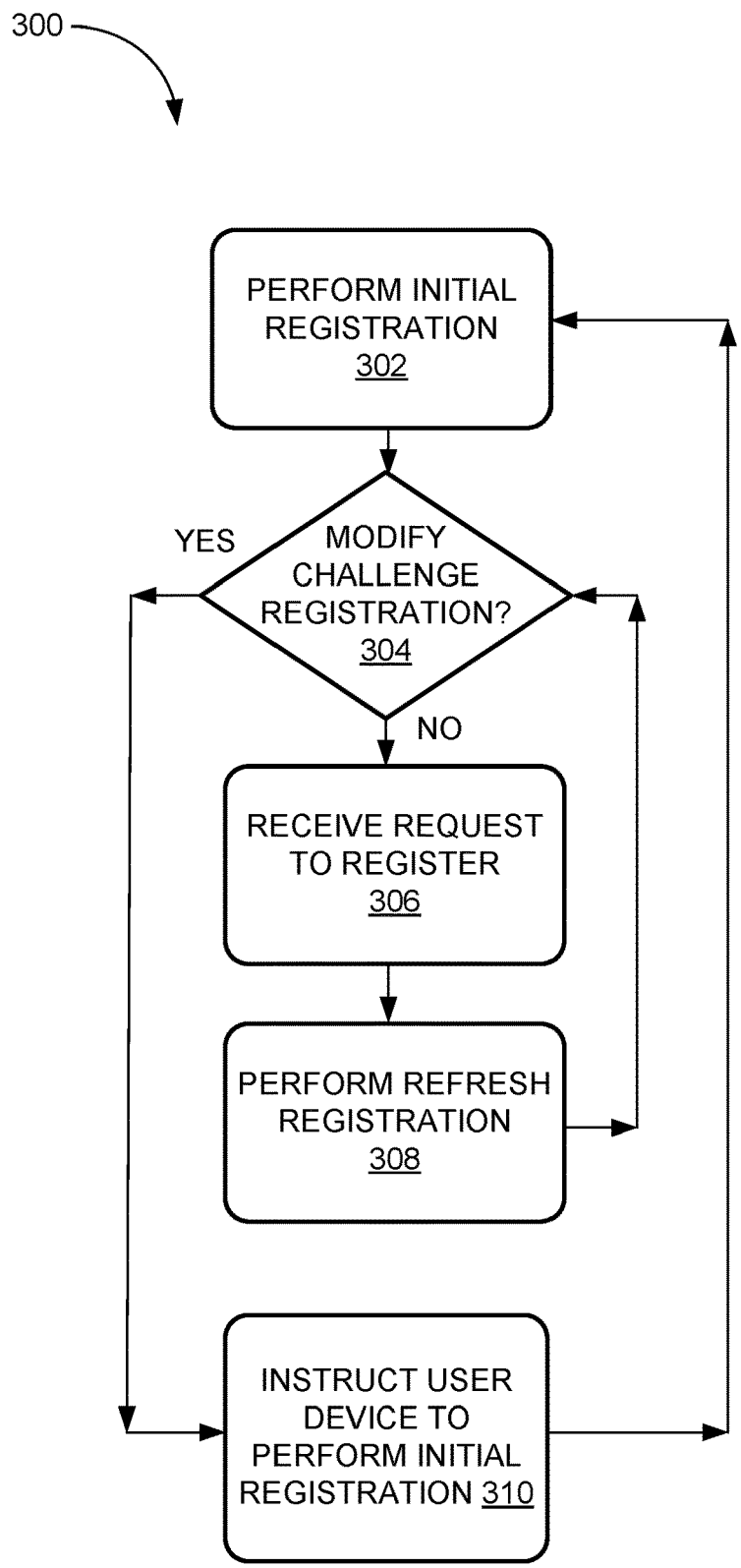
FIG. 3 is an illustrative process for modifying a challenge requirement for user registrations, in accordance with some examples of the present disclosure.

FIG. 3 is an illustrative process 300 for modifying a challenge requirement for user registrations. The process 300 and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 3, the process 300 commences at operation 302, where the originating UE 112 performs an initial registration. As noted above, in an initial registration, the originating UE 112 is instructed not to send an INVITE to connect a call until a challenge operation is complete.

The process continues to operation 304, where a determination is made as to whether or not a subsequent registration is to be modified from a refresh registration to an initial registration. As illustrated in FIG. 3, the modification may be implemented after an initial registration, so that the next registration is also an initial registration, or as will be described below, after a refresh registration.

If at operation 304 the determination is that the next registration is to not be modified, then at operation 306 when a new registration request is received, at operation 308, a refresh registration is performed. As illustrated in FIG. 3, once operation 308 is performed, the process 300 continues to the operation 304, where a determination is made as to whether or not a subsequent registration is to be modified from a refresh registration to an initial registration. If after an initial operation at operation 302 or after a refresh registration at operation 308 it is determined at operation 304 that a subsequent registration is to be an initial registration, the process 300 continues to operation 310, where the originating UE 112 is instructed to perform an initial registration at operation 302 rather than a refresh registration at operation 308.

Figure 4:
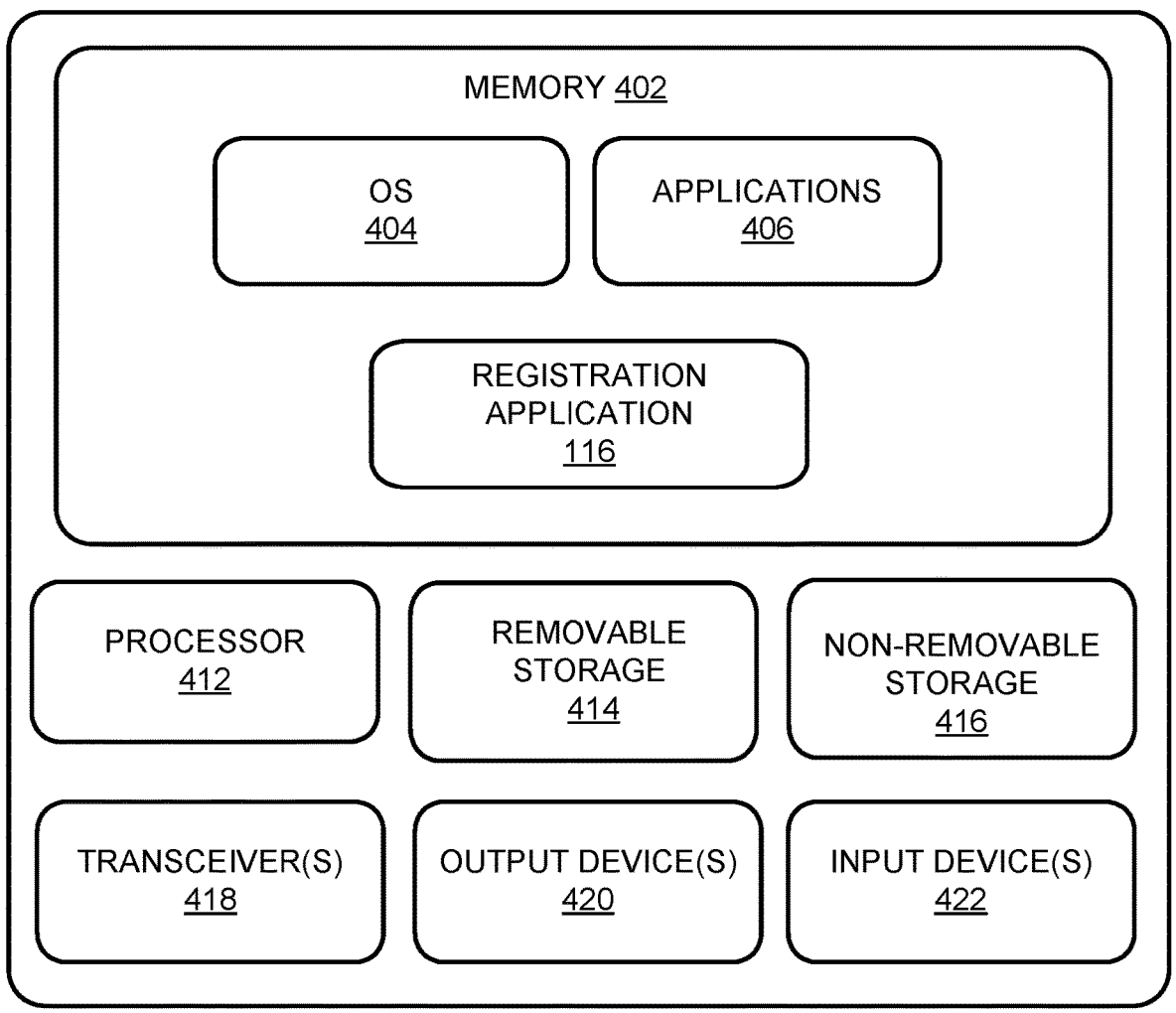
FIG. 4 depicts a component level view of an endpoint for use with the systems and methods described herein, in accordance with some examples of the present disclosure.

FIG. 4 depicts a component level view of the originating UE 112 for use with the systems and methods described herein. The originating UE 112 could be any device capable of communicating using the network 104. The originating UE 112 can comprise several components to execute the above-mentioned functions. As discussed below, the originating UE 112 can comprise memory 402 including an operating system (OS) 404 and one or more standard applications 406. The standard applications 406 can include many features common to user equipment such as, for example, applications initiated using voice commands (such as Internet searches, home appliance controls, and the like), music player, Internet radio, and other such applications. In this case, the standard applications 406 can also comprise a video call application, an audio call application, and a messaging application to enable users to engage in audio calls, video calls, and messaging, among other things. The standard applications 406 can also include contacts to enable the user to select a contact to initiate, for example, a video call, audio call, text message, etc.

The originating UE 112 can also comprise the registration application 116. As mentioned above, the registration application 116 is an application executing on the originating UE 112 that receives registration modification instructions from the network 104. Modification instructions may be received an implemented in other ways and are considered to be within the scope of the presently disclosed subject matter. Once a registration modification instruction is received by the network 104 (or other entity as appropriate), the registration application 116 causes the originating UE 112 to perform an initial registration rather than a refresh registration.

The originating UE 112 can also comprise one or more processors 412 and one or more of removable storage 414, non-removable storage 416, transceiver(s) 418, output device(s) 420, and input device(s) 422. In various implementations, the memory 402 can be volatile (such as random access memory (RAM)), non-volatile (such as read only memory (ROM), flash memory, etc.), or some combination of the two. The memory 402 can include all, or part, of the registration application 116. In some examples, rather than being stored in the memory 402, some, or all, of the registration application 116, and other information, can be stored on a remote server or a cloud of servers accessible by the originating UE 112.

The memory 402 can also include the OS 404. The OS 404 varies depending on the manufacturer of the originating UE 112. The OS 404 contains the modules and software that support basic functions of the originating UE 112, such as scheduling tasks, executing applications, executing registration operations, and controlling peripherals. In some examples, the OS 404 may be modified or may be instructed by the registration application 116 that a registration modification instruction has been received. In some examples, the OS 404 can enable the registration application 116, and provide other functions, as described above, via the transceiver(s) 418. The OS 404 can also enable the originating UE 112 to send and retrieve other data and perform other functions using the registration application 116.

The originating UE 112 can also comprise one or more processors 412. In some implementations, the processor(s)

412 can be one or more central processing units (CPUs), graphics processing units (GPUs), both CPU and GPU, or any other processing unit. The originating UE 112 may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the originating UE 112. Any such non-transitory computer-readable media may be part of the originating UE 112 or may be a separate database, databank, remote server, or cloud-based server.

In some implementations, the transceiver(s) 418 include any transceivers known in the art. In some examples, the transceiver(s) 418 can include wireless modem(s) to facilitate wireless connectivity with other components (e.g., between the originating UE 112 and a wireless modem that is a gateway to the Internet), the Internet, and/or an intranet. Specifically, the transceiver(s) 418 can include one or more transceivers that can enable the originating UE 112 to send and receive data, video calls, audio calls, and messages and to perform other functions. Thus, the transceiver(s) 418 can include multiple single-channel transceivers or a multi-frequency, multi-channel transceiver to enable the originating UE 112 to send and receive video calls, audio calls, messaging, etc. The transceiver(s) 418 can enable the originating UE 112 to connect to multiple networks including, but not limited to 2G, 3G, 4G, 5G, and Wi-Fi networks. The transceiver(s) 418 can also include one or more transceivers to enable the originating UE 112 to connect to future (e.g., 6G) networks, Internet-of-Things (IoT), machine-to-machine (M2M), and other current and future networks.

The transceiver(s) 418 may also include one or more radio transceivers that perform the function of transmitting and receiving radio frequency communications via an antenna (e.g., Wi-Fi or Bluetooth®). In other examples, the transceiver(s) 418 may include wired communication components, such as a wired modem or Ethernet port, for communicating via one or more wired networks. The transceiver(s) 418 can enable the originating UE 112 to make audio and video calls, download files, access web applications, and provide other communications associated with the systems and methods, described above.

In some implementations, the output device(s) 420 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 420 can also include speakers, or similar devices, to play sounds or ringtones when an audio call or video call is received. Output device(s) 420 can also include ports for one or more peripheral devices, such as headphones, peripheral speakers, or a peripheral display.

In various implementations, input device(s) 422 include any input devices known in the art. For example, the input device(s) 422 may include a camera, a microphone, or a keyboard/keypad. The input device(s) 422 can include a touch-sensitive display or a keyboard to enable users to enter data and make requests and receive responses via web applications (e.g., in a web browser), make audio and video calls, and use the standard applications 406, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 422 and an output device 420.

Figure 5:
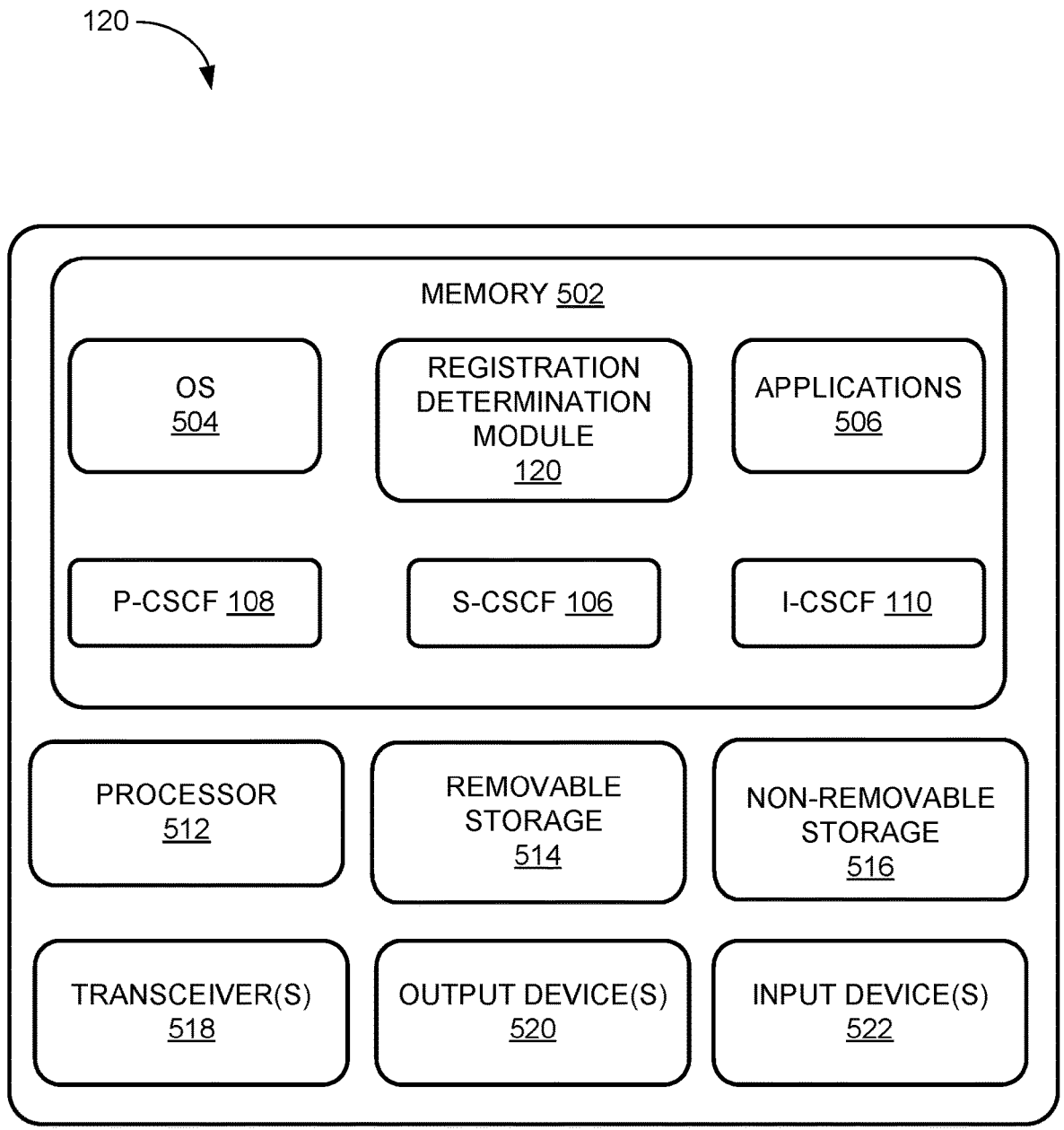
FIG. 5 depicts a component level view of a networks session control for use with the systems and methods described herein, in accordance with some examples of the present disclosure.

FIG. 5 depicts a component level view of the network session control 102 for use with the systems and methods described herein. The network session control 102 could be any device capable of providing the S-CSCF 106, the P-CSCF 108, and/or the I-CSCF 110 either as an integrated function with the network session control 102 (as illustrated in FIG. 1) or, in the alternative, coordinating with the S-CSCF 106, the P-CSCF 108, and/or the I-CSCF 110 if provided by another component, or combinations thereof. The network session control 102 can comprise several components to execute the above-mentioned functions. As discussed below, network session control 102 can comprise memory 502 including an operating system (OS) 504 and one or more standard applications 506. The standard applications 406 can comprise one or more applications relating to network services such as, but not limited it, a video call application, an audio call application, and a messaging application to enable users to engage in audio calls, video calls, and messaging, among other things.

The network session control 102 can also comprise the registration determination module 120. As mentioned above, the registration determination module 120 may determine that the next registration operation of the originating UE 112 is to be an initial registration operation, where the originating UE 112 is to wait for an indication that the challenge is completed successful, rather than a refresh registration. The registration determination module 120 may also cause the issuance of modification instructions to the registration application 116 of the originating UE 112 to cause the originating UE 112 to change its manner of operation.

The network session control 102 can also comprise one or more processors 512 and one or more of removable storage 514, non-removable storage 516, transceiver(s) 518, output device(s) 520, and input device(s) 522. In various implementations, the memory 502 can be volatile (such as random access memory (RAM)), non-volatile (such as read only memory (ROM), flash memory, etc.), or some combination of the two. The memory 502 can include all, or part, of registration determination module 120 as well as the S-CSCF 106, the P-CSCF 108, and/or the I-CSCF 110 if provided by the network session control 102. In some examples, rather than being stored in the memory 502, some, or all, of the registration determination module 120, the S-CSCF 106, the P-CSCF 108, and/or the I-CSCF 110, and other information, can be stored on a remote server or a cloud of servers accessible by the network session control 102.

The memory 502 can also include the OS 504. The OS 504 varies depending on the manufacturer of the network session control 102, the type of network services provided, and the like. The OS 504 contains the modules and software that support basic functions of the network session control 102. In some examples, the OS 504 can enable the registration determination module 120 to transmit and receive instructions, and provide other functions, as described above, via the transceiver(s) 518. The OS 504 can also enable the network session control 102 to send and retrieve other data and perform other functions.

The network session control 102 can also comprise one or more processors 512. In some implementations, the processor(s) 512 can be one or more central processing units (CPUs), graphics processing units (GPUs), both CPU and GPU, or any other processing unit. The network session control 102 may also include additional data storage devices (removable and/or non-removable) such as, for example, magnetic disks, optical disks, or tape. Such additional storage is illustrated in FIG. 5 by removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. The memory 502, removable storage 514, and non-removable storage 516 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the network session control 102. Any such non-transitory computer-readable media may be part of the network session control 102 or may be a separate database, databank, remote server, or cloud-based server.

In some implementations, the transceiver(s) 518 include any transceivers known in the art. In some examples, the transceiver(s) 518 can include wireless modem(s) to facilitate wireless connectivity with other components (e.g., between the originating UE 112 and the network session control 102), the Internet, and/or an intranet. Specifically, the transceiver(s) 518 can include one or more transceivers that can enable the network session control 102 to send and receive data, enable video calls, audio calls, and messages and to perform other functions. Thus, the transceiver(s) 518 can include multiple single-channel transceivers or a multi-frequency, multi-channel transceiver to enable the network session control 102 to enable video calls, audio calls, messaging, etc.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system, comprising:
   a memory storing computer-executable instructions; and
   a processor in communication with the memory, the computer-executable instructions causing the processor to perform acts comprising:

receiving an initial registration associated with a first request received from a user equipment (UE) to place a first call on a cellular network, wherein the UE during the initial registration is configured to wait for an acknowledgment from the cellular network prior to transmitting the first request to place the first call;

determining, during a refresh registration mode of the UE, for the UE to perform a second initial registration rather than a refresh registration, wherein during the refresh registration mode of the UE, the UE is not configured to wait for a second acknowledgment from the cellular network prior to transmitting a second request to place a second call; and transmitting an instruction to the UE to perform the second initial registration rather than the refresh registration, wherein during the second initial registration, the UE is configured to wait for the second acknowledgment from the cellular network prior to the UE transmitting the second request to place the second call.

2. The system of claim 1, wherein determining, during the refresh registration mode of the UE, for the UE to perform the second initial registration rather than the refresh registration comprises determining that the UE has performed a predetermined number of prior refresh registrations.

3. The system of claim 1, wherein determining, during the refresh registration mode of the UE, for the UE to perform the second initial registration rather than the refresh registration comprises determining that the UE has a lower priority than a second UE, wherein the second UE is authorized to perform a second UE refresh registration.

4. The system of claim 1, wherein determining, during the refresh registration mode of the UE, for the UE to perform the second initial registration rather than the refresh registration comprises determining that a data transfer amount associated with the network for a period of time exceeds a threshold amount.

5. The system of claim 1, wherein determining, during the refresh registration mode of the UE, for the UE to perform the second initial registration rather than the refresh registration is based at least in part on a subscription plan associated with the UE.

6. The system of claim 1, wherein determining, during the refresh registration mode of the UE, for the UE to perform the second initial registration rather than the refresh registration comprises determining that the first request to place the first call is not received within a period of time associated with another call request associated with a destination telephone number.

7. The system of claim 1, wherein determining, during the refresh registration mode of the UE, for the UE to perform the second initial registration rather than the refresh registration comprises receiving a notification that an emergency condition has occurred that affects the cellular network, wherein the second initial registration is used to balance a load at the cellular network.

8. A method of registering a user equipment (UE), the method comprising:
   receiving an initial registration associated with a first request received from the UE to place a first call on a cellular network, wherein the UE during the initial registration is configured to wait for an acknowledgment from the cellular network prior to transmitting the first request to place the first call;

determining, during a refresh registration mode of the UE, for the UE to perform a second initial registration rather than a refresh registration, wherein during the refresh registration mode of the UE, the UE is not configured to wait for a second acknowledgment from the cellular network prior to transmitting a second request to place a second call; and transmitting an instruction to the UE to perform the second initial registration rather than the refresh registration, wherein during the second initial registration, the UE is configured to wait for the second acknowledgment from the cellular network prior to the UE transmitting the second request to place the second call.

9. The method of claim 8, wherein determining, during the refresh registration mode of the UE, for the UE to perform the second initial registration rather than the refresh registration comprises determining that the UE has performed a predetermined number of prior refresh registrations.

10. The method of claim 8, wherein determining, during the refresh registration mode of the UE, for the UE to perform the second initial registration rather than the refresh registration comprises determining that the UE has a lower priority than a second UE, wherein the second UE is authorized to perform a second UE refresh registration.

11. The method of claim 8, wherein determining, during the refresh registration mode of the UE, for the UE to perform the second initial registration rather than the refresh registration comprises determining that a data transfer amount associated with the cellular network for a period of time exceeds a threshold amount.

12. The method of claim 8, wherein determining, during the refresh registration mode of the UE, for the UE to perform the second initial registration rather than the refresh registration is based at least in part on a subscription plan associated with the UE.

13. The method of claim 8, wherein determining, during the refresh registration mode of the UE, for the UE to perform the second initial registration rather than the refresh registration comprises determining that the first request to place the first call is not received within a period of time associated with another call request associated with a destination telephone number.

14. The method of claim 8, wherein determining, during the refresh registration mode of the UE, for the UE to perform the second initial registration rather than the refresh registration comprises receiving a notification that a network resource is disabled.

15. A non-transitory computer-readable storage medium having computer-executable instructions stored thereupon that, when executed by a computer, cause the computer to perform acts comprising:

receiving an initial registration associated with a first request received from a user equipment (UE) to place a first call on a cellular network, wherein the UE during the initial registration is configured to wait for an acknowledgment from the cellular network prior to transmitting the first request to place the first call;

determining, during a refresh registration mode of the UE, for the UE to perform a second initial registration rather than a refresh registration, wherein during the refresh registration mode of the UE, the UE is not configured to wait for a second acknowledgment from the cellular network prior to transmitting a second request to place a second call; and transmitting an instruction to the UE to perform the second initial registration rather than the refresh registration, wherein during the second initial registration, the UE is configured to wait for the second acknowledgment from the cellular network prior to the UE transmitting the second request to place the second call.

16. The non-transitory computer-readable storage medium of claim 15, wherein determining, during the refresh registration mode of the UE, for the UE to perform the second initial registration rather than the refresh registration comprises determining that the UE has performed a predetermined number of prior refresh registrations.

17. The non-transitory computer-readable storage medium of claim 15, wherein determining, during the refresh registration mode of the UE, for the UE to perform the second initial registration rather than the refresh registration comprises determining that the UE has a lower priority than a second UE, wherein the second UE is authorized to perform a second UE refresh registration.

18. The non-transitory computer-readable storage medium of claim 15, wherein determining, during the refresh registration mode of the UE, for the UE to perform the second initial registration rather than the refresh registration comprises determining that a data transfer amount associated with the cellular network for a period of time exceeds a threshold amount.

19. The non-transitory computer-readable storage medium of claim 15, wherein determining, during the refresh registration mode of the UE, for the UE to perform the second initial registration rather than the refresh registration is based at least in part on a subscription plan associated with the UE.

20. The non-transitory computer-readable storage medium of claim 15, wherein determining, during the refresh registration mode of the UE, for the UE to perform the second initial registration rather than the refresh registration comprises determining that the first request to place the first call is not received within a period of time associated with another call request associated with a destination telephone number.

* * * * *